(12) United States Patent
Schwerzel et al.

(10) Patent No.: US 6,226,083 B1
(45) Date of Patent: May 1, 2001

(54) INTEGRATED-OPTIC SPECTROMETER AND METHOD

(75) Inventors: Robert E. Schwerzel, Alpharetta; Nile F. Hartman, Stone Mountain, both of GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/305,391

(22) Filed: May 5, 1999

(51) Int. Cl.$^7$ ........................................... G01J 3/40
(52) U.S. Cl. ..................... 356/305; 356/300; 356/303; 356/435
(58) Field of Search ................... 356/305, 300, 356/435, 303

(56) References Cited

U.S. PATENT DOCUMENTS 4,684,252 * 8/1987 Makiguchi et al. ................. 356/328
4,790,669 * 12/1988 Christensen ........................ 356/435

OTHER PUBLICATIONS

P. St. J. Russell, "Novel Thick–Grating Beam–Squeezing Device in $ta_2O_5$ Corrugated Planar Waveguide," Electronics Letters, vol. 20, No. 2, Jan. 19, 1984, pp. 72–73.

G. Notni and R. Kowarschik, "Diffraction Analysis if Three–Dimensional Volume Grating With Arbitrary Boundaries," J. Opt. Soc. Am. A, vol.6, No. 11, Nov. 1989, pp. 1682–1691.

Dietrich Marcuse, "Theory of Dielectric Optical Waveguides," Academic Press, New York, 1974.

L. A. Weller–Brophy and D. G. Hall, "Local Norman Mode Analysisw of Guided Mode Interaction With Waveguide Grating," IEEE, Journal of Lightwave Technology, vol. 6, No. 6, Jun. 1988, pp. 1069–1082.

Herwig Kogelnik, "Coupled Wave Theory for Thick Hologram Grating," The Bell System Technical Journal, vol. 48, No. 9, Nov. 1969, pp. 2909–2947.

R. P. Kenan, "Theory of Diffraction of Guided Optical Waves byThick Holograms, " Journal of Applied Physics, vol. 46, No. 10, Oct. 1975, pp. 4545–4551.

Yufei Bao, C.M. Verber, and R. P. Kenan, "Influence Of Grating Shapes On Beam Profiles For Right–Angle Guided–Wave Diffraction," Nov. 7, 1991, pp. 1–3, School of Electrical Engineering, Georgia Institute of Technology, Atlanta, Georgia, 30332.

Robert E. Schwerzel, Nile F. Hartman, "Multi–Wavelength Integrated–Optic Reflectance Spectrophotometer," Addendum to Invention Disclosure #1409, Nov. 24, 1997, pp. 1–2.

Dr. Robert E. Schwerzel, "Development of an Integrated–Optics Color Measurement Spectrometer," Oct. 12, 1998, pp. 1–21.

(List continued on next page.)

Primary Examiner—Frank G. Font
Assistant Examiner—Reginald A. Ratliff
(74) Attorney, Agent, or Firm—Thomas, Kayden, Horstemeyer & Risley LLP

(57) ABSTRACT

An integrated-optic spectrometer is disclosed for analyzing the composition of light reflected off a sample under analysis. In a simplified embodiment, the spectrometer includes a buffer, located on the top of a substrate, which is etched to create a diffraction grating having grating lines. The diffraction grating and grating lines are formed to provide diffraction of discrete wavelengths of light, while providing for maximum transmission of non-diffracted wavelengths. A waveguide is fabricated on top of the etched buffer through which the reflected light is directed. A photodiode detector array is located above the waveguide into which the diffracted wavelengths are diffracted, providing an analysis of the composition of the reflected light. A clad encompasses the integrated-optic spectrometer, thereby providing protection from outside interference.

20 Claims, 6 Drawing Sheets

OTHER PUBLICATIONS

"Liga–IR–Microspectrometer for Gas Detection," Optics–IR–Spectrometer, Nov. 17, 1998, pp. 1–3. htt://www.microparts.de/OpticsIR.htm and http:www.microparts.de/irspek.htm.

"Tenth Monthly Progress Report on Development of an Integrated–Optic Device to Datacolor International," Goergia Tech Research Institute, Electro–Optics, Environment, and Materials Laboratory, Georgia Institute of Technology, Atlanta, GA, 30332–0825, Nov. 19, 1998, pp. 1–3.

Nile F. Hartmann, Robert Schwerzel, "Multi Wavelength Integrated–Optic Reflectance Spectrophotometer," Second Addendum to Invention Disclosure #1490, Jan. 8, 1999, pp. 1–2.

L. Solymar, "A General Two–Dimensional Theory for Volume Holograms," Appl. Phys. Lett. 31(12), Dec. 15, 1977, pp. 820–822.

P. St. J. Russel and L. Solymar, "The Properties of Holographic Overlap Grating," Optica Acta, vol. 26, No. 3. 1979, pp. 329–347.

J. Van Roey and P. E. Lagasse, "Coupled Wave Analysis of Obliquely Incident Waves in thin Film Grating," Applied Optics, vol. 20, No. 3, Feb. 1, 1981, pp. 423–429.

J. Marcou, R. Attia, and N. Gremillet, "Analysis of Bragg Grating Coupled Between Two Channel Waveguides Intersecting at a Right Angle," IEEE Journal of Quantum Electronics, vol. QE–22, No. 9, Sep. 1986, pp. 1557–1567.

P. St. J. Russell, "Thick Grating Focussing–Device–Design Using Poynting–Vector–Optics," Applioed Physics, B 26, 1981, pp.37–42.

* cited by examiner

INTEGRATED-OPTIC SPECTROMETER AND METHOD

FIELD OF THE INVENTION

The present invention generally relates to a system for analyzing light. More specifically, the invention is related to an integrated-optic spectrometer and method for guiding an inputted light source and diffracting discrete wavelengths from the guided light for composition analysis, by use of successive diffraction gratings.

BACKGROUND OF THE INVENTION

A spectrometer is generally any device that produces a spectrum by the dispersion of light and is calibrated to measure transmitted energy or radiant intensities with respect to wavelengths of radiation. Said in a different way, a spectrometer is a photometer for measuring the relative intensities of light in different parts of a spectrum.

Spectrometers are used in numerous different industries. Examples of such industries include the automotive industry, for identifying certain paint or pigment compositions, thereby making possible the application of a matching paint; the textile industry, for ensuring the consistency of color from one dye lot to the next; and the cosmetic industry, for identifying the facial properties of a consumer, thereby allowing the identification of cosmetics which will enhance these facial properties.

Spectrometers utilized for these and other purposes typically utilize a diffraction grating which may be either curved or flat, to disperse the light into a spectrum. The diffracted light intensity at each wavelength is then measured by a suitable detector, such as a photodiode detector array or a photomultiplier tube.

While current spectrometers are effective in analyzing the optical properties of certain samples, they are generally costly, bulky, and heavy. Therefore, there is a need in

SUMMARY OF THE INVENTION

In the context of this document, "integrated-optic" refers to a device or devices, fabricated on or in an optical waveguide by any process or method for producing micromachined or micro-level structures, including, but not limited to, disposition techniques (e.g., sputtering, evaporation, screen printing, etc.), microlithography, holegraphy, or thin-film fabrication techniques.

Briefly described, the invention is an integrated-optic spectrometer which utilizes the combination of a waveguide, fabricated onto an oxidized substrate, which has an array of diffraction gratings and a detector array, capable of analyzing discrete wavelengths, which is mounted on the waveguide so as to receive the light of different wavelengths diffracted by the grating array. The diffraction gratings each comprise a series of grating lines and are constructed to provide for optimal transmission of wavelengths not diffracted by the diffraction grating. Therefore, the inputted light is guided through the waveguide and discrete wavelengths are diffracted by the diffraction gratings onto the photodiode detector array which in turn measures the intensity of the light at the discrete wavelengths for determining composition, while optimally transmitting non-diffracted wavelengths through the waveguide.

In general, the architecture of a first embodiment of the invention comprises a single layer waveguide. The surface layer of a substrate is first oxidized, creating a buffer layer. This buffer layer is then either etched by a technique such as holographic or microlithographic techniques, or otherwise fabricated upon, thereby creating diffraction gratings. A waveguide is then fabricated onto the buffer layer creating a path through which the light to be analyzed may travel. A clad layer is then fabricated to encompass the waveguide and gratings, thereby providing protection to the waveguide and hampering interference from outside elements. Finally, a suitable detector array is mounted on the clad layer so as to measure the intensity of the wavelengths diffracted by each grating in the array. Depending on the desired field of application, the diffraction gratings may be designed to diffract the selected wavelength of light either within the plane of the waveguide, but in a different direction from the inputted light, or out of plane of the waveguide.

A second embodiment of the present invention utilizes a bi-layer waveguide. This embodiment comprises a first layer of waveguide fabricated onto the oxidized surface layer of a substrate, or buffer layer, a second buffer layer fabricated onto the top of the first waveguide layer, a grating structure etched or otherwise fabricated onto the second buffer layer, thereby fabricating the grating structure, a second waveguide layer fabricated onto the top of the second buffer layer, and a clad layer fabricated on top of the second waveguide layer. A suitable detector array is then mounted either on top of the clad or along its side, as described previously. Fabricating the diffraction gratings on, or in, the second buffer layer of this embodiment maximizes the intensity of the diffracted light due to the location of the diffraction gratings between the first and second waveguide layers. Because the second buffer layer in quite thin, as compared to the two waveguide layers, this multi-layer system functions as a single thick waveguide with gratings embedded in or near its center.

Optionally, the integrated-optic spectrometer may be equipped with numerous diffraction gratings constructed in succession. Both of the above-mentioned embodiments utilize diffraction gratings which are constructed to provide for optimal transmission of wavelengths to successive diffraction gratings, after the diffraction of discrete wavelengths by preceding diffraction gratings. Therefore, successive diffraction gratings are provided for while providing an accurate analysis of the diffracted light by the detector array.

The invention has numerous advantages, a few of which are delineated hereafter, as examples. Note that the embodiments of the invention that are described herein possess one or more, but not necessarily all, of the advantages set out hereafter.

One advantage of the invention is that it may be utilized in a multitude of industries due to its low weight, and small size.

Another advantage of the invention is that it may be implemented on a single chip, thereby decreasing cost and making possible the fabrication of hand-held battery powered devices, incorporating the invention.

Another advantage of the invention is that it allows for multiple diffraction gratings to be utilized in succession while preventing each successive diffraction grating from distorting non-diffracted wavelengths which pass through the waveguide.

Another advantage is that the second embodiment provides for a thicker waveguide since two waveguide layers are used. Therefore, a larger reflected light source may be analyzed, and the inputted light may be more easily coupled into the waveguide.

Another advantage provided by the second embodiment is that it provides diffraction gratings at the peak of the guided mode intensities, insuring strong interaction with the gratings.

Other objects, features, and advantages of the present invention will become apparent to one with reasonable skill in the art upon examination of the following drawings and detailed description. It is intended that all such additional objects, features, and advantages be included herein within the scope of the present invention, as defined by the claims.

BRIEF DESCRIPTION OF THE DRAWINGS

The present invention will be more fully understood from the detailed description given below and from the accompanying drawings of the preferred embodiments of the invention, which, however, should not be taken to limit the invention to the specific embodiment, but are for explanation and for better understanding only. Furthermore, the drawings are not necessarily to scale, emphasis instead being placed upon clearly illustrating the principles of the invention. Finally, like reference numerals in the figures designate corresponding parts throughout the several views.

DESCRIPTION OF THE PREFERRED EMBODIMENT

Figure 1:
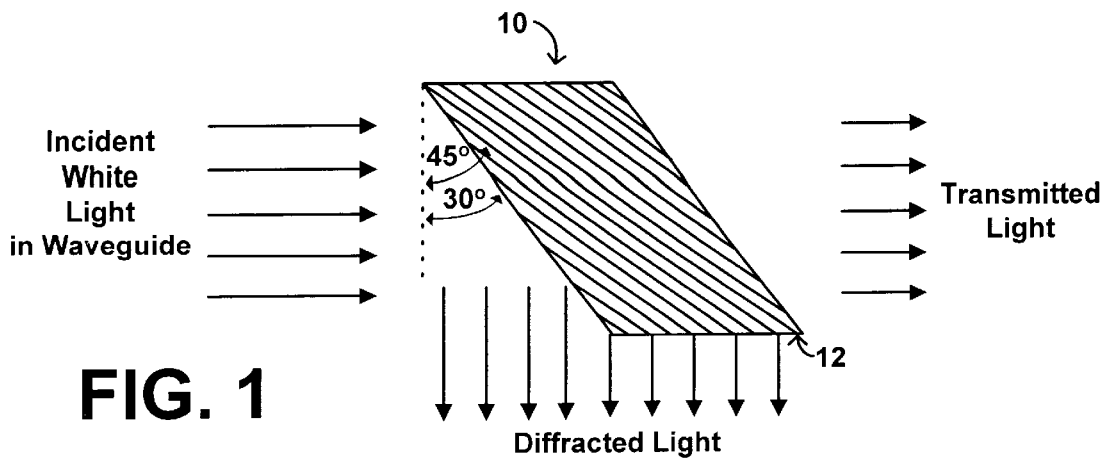
FIG. 1 shows a representative diffraction grating in accordance with the present invention.

FIG. 1 shows a diffraction grating 10 for utilization in an integrated-optic spectrometer 14 (FIG. 6) in accordance with the present invention. In accordance with the invention, the diffraction grating 10 is formed to diffract discrete wavelengths from incident light, while providing for optimal transmission of the wavelengths which are not diffracted. A series of grating lines 12 are formed on the diffraction grating 10 and perform the actual diffraction of the incident light. In accordance with the first or second embodiments of the invention, for example, the diffraction grating 10 may be in the form of a 30° parallelogram with the individual grating lines at an angle of 45° to the direction of propagation of incident light within the waveguide. These specifications for the diffraction grating 10 and grating lines 12 are ideal due to their providing for optimal diffraction of discrete wavelengths within the plane of the waveguide, while also providing for optimal transmission of non-diffracted wavelengths. As shall be further explained below with reference to FIG. 2, the diffraction provided for by these specifications occurs such that the light of the selected specifications remains within the waveguide but is coupled out of the original light path at approximately right angles to the original direction of light propagation.

It will be appreciated by those reasonably skilled in the art that diffraction grating 10/grating line 12 combinations having different specifications (different shaped diffraction grating 10 and a different angled grating lines 12) may be utilized to provide an effect similar to that provided by the 30° parallelogram, however, the diffraction and transmission performed by such combinations may not prove to be as optimal in nature. For example, in an alternate embodiment, the diffraction grating 10 may be in the shape of a square or a rectangle with the grating lines 12 at right angles to the direction of propagation of light within the waveguide, such that light is coupled out of the wave guide in a direction more or less perpendicular to the plane of the waveguide.

The size and spacing of the individual grating lines 12 determine which discrete wavelengths are diffracted by the diffraction grating 10. It is due to the form of the diffraction grating 10, and the grating lines 12 therein, that light may have certain discrete wavelengths diffracted by the diffraction grating 10, while allowing other wavelengths of the light in the waveguide to be transmitted with minimal interference. As an example, for the short wavelengths of blue light to be diffracted, the grating lines 12 must contain a very narrow space between each grating line. Therefore, the diffraction grating 10, with encompassing narrow grating lines 12, will diffract the shorter wavelengths, while allowing longer wavelengths to be optimally transmitted through the waveguide. Similarly, for the longer wavelengths of red light to be diffracted, the grating lines 12 must have a wider space between each grating line. Therefore, a different diffraction grating 10 with encompassing wider grating lines 12 will diffract longer wavelengths while allowing other wavelengths (both longer and shorter) to be optimally transmitted through the waveguide.

Figure 2:
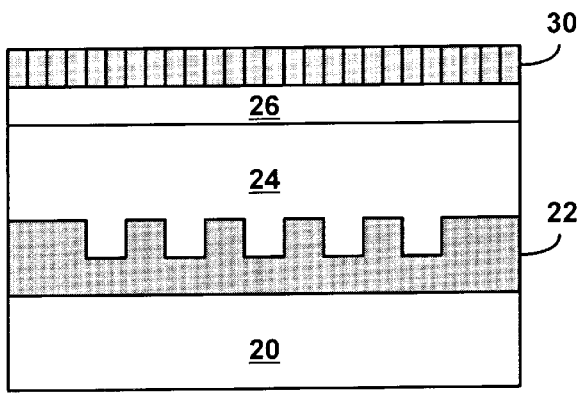
FIG. 2 shows a cross-section of an integrated-optic spectrometer in accordance with a first embodiment of the present invention.

FIG. 2 shows an integrated-optic spectrometer 14 in accordance with the first embodiment of the invention. For fabrication of the integrated-optic spectrometer an optically flat surface of silicon dioxide ($SiO_2$), is formed on the top surface of a suitable substrate 20 creating a buffer layer 22 thereupon. As an example, if the substrate 20 is formulated from glass or quartz, the buffer layer 22 is formed by simply polishing the substrate 20. As another example, if the substrate 20 is fabricated from silicon, the silicon dioxide buffer layer 22 can be grown thermally or deposited by sputtering or other techniques.

In the first embodiment, the substrate 20 is made of silicon and, therefore, after thermal oxidation, the buffer layer 22 is $SiO_2$. As mentioned above, alternate materials which may be utilized in formulating the substrate 20, including, but not limited to, fused quartz or optical glass. Silicon, however, is the preferred substrate material due to its atomically flat surface and its dark composition and, therefore, its absorbing characteristics. While fused quartz, optical glass, and silicon have been used as examples of materials which may be used for formulating the substrate 20, one of ordinary skill in the art will appreciate that any material with characteristics similar to silicon dioxide may be used.

Figure 4:
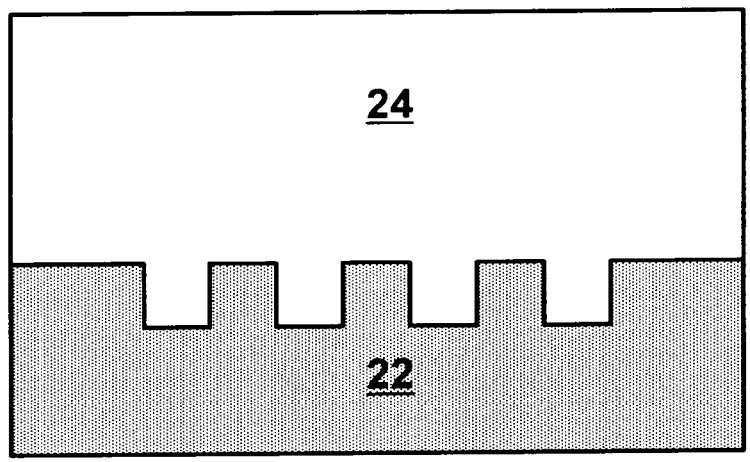
FIG. 4 shows a cross-section of diffraction gratings utilizing negative grating lines for utilization in the spectrometers represented by FIGS. 2 and 3.
Figure 5:
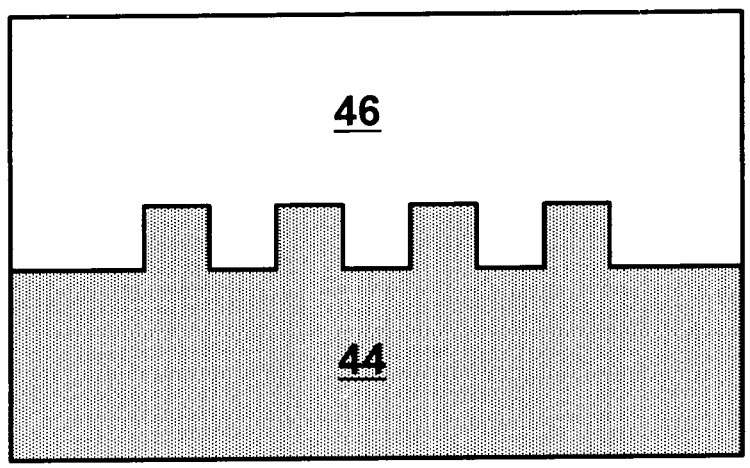
FIG. 5 shows a cross-section of diffraction gratings utilizing positive grating lines for utilization in the spectrometers represented by FIGS. 2 and 3.

A diffraction grating 10 is etched into the buffer layer 22 using, for example, photolithography. This etching leaves a negative grating line structure, as shown in FIG. 4, through which the reflected incident light is diffracted. As previously mentioned, the grating lines 12 may be constructed to be at an angle of 45° with the vertical plane of the waveguide. Alternatively, the diffraction grating 10 may be deposited on top of the buffer layer 22 instead of etched into the buffer layer 22, thereby resulting in a positive grating structure, as shown in FIG. 5. The depositing process may be performed by low-temperature sputtering, sol-gel solution techniques, spin-coating of a polymer film, or other techniques known by one of ordinary skill in the art which accomplish similar results. The grating structure may also be fabricated by depositing additional buffer through openings in a positive photoresist layer.

A waveguide layer 24 is fabricated onto the etched buffer layer 22 by any of a number of suitable processes, such as spin coating (which utilizes a mechanism for spinning the etched buffer layer 22 while adding the waveguide solution) or dip coating. The thickness of the waveguide layer 24 will be determined and controlled by the viscosity of the solution utilized to create the waveguide layer 24 and the speed of spinning performed during fabrication. The significance of using such processes as thin coating is that a perfectly planar surface is desired so as to limit possible reflective interference in the waveguide layer 24. Other processes of fabricating the waveguide 24 onto the buffer layer 22 will be well known to those of ordinary skill in the art. In the first embodiment, the waveguide layer 24 is made of a polymer material such as polyphenylmethacrylate, with a refractive index of approximately 1.55 to 1.6.

The intensity of the light guided within the waveguide layer 24 is typically most intense at the center of the waveguide layer 24. Therefore, due to maximum guided light intensity being at the center of the waveguide layer 24, instead of at the bottom, which is where the diffraction grating 22 is located, the use of a negative grating line structure is made possible due to the evanescent field of the guided light. The evanescent field is a low intensity portion of the guided light, which extends past the waveguide layer 24, into the buffer 22. To provide for optimal diffraction and transmission of the reflected light by the diffraction grating 10, the buffer layer 22 has a relatively low reflective index of approximately 1.47, as compared to the higher refractive index of the waveguide layer 24, which is approximately 1.55 to 1.6. Due to the absorbing characteristics of the substrate 20, any light which extends past the buffer layer 22 is absorbed, preventing reflection into the waveguide layer 24 which may cause interference with non-diffracted wavelengths. Therefore, the efficiency of the first embodiment is dependent upon how much light is in the evanescent tail, as this governs the strength of the interaction with the diffraction grating 10.

A clad layer 26 is fabricated to encompass the integrated-optic spectrometer, thereby providing protection and isolation of the waveguide 24 from outside elements, such as, for example, dust. Preferably, the clad 26 is made of a low index polymer, such as Teflon® AF (Amorphus Fluoropolymer), which is manufactured by and made commercially available from DuPont. Other materials which may be utilized for making the clad 26 include methacrylates, fluorinated acrylates, or silicon dioxide. The diffracted index of the clad 26 is approximately 1.35 to 1.4. Since the clad 26 has a lower refracted index than the waveguide 24, the reflected incident light is reflected off the clad 26 and prevented from escaping the waveguide 24.

A photodiode detector array 30, for example, an array of charge coupled devices (CCDs), is attached to the top portion of the clad layer 26 for analyzing the diffracted light. The purpose and composition of the photodiode detector array 30 is further discussed herein with reference to FIG. 6 and FIG. 7.

More than one diffraction grating 10 may be etched upon the buffer layer 22. Therefore, as previously mentioned, the refractive indices of the different layers act together to allow the diffraction of discrete wavelengths from a reflected incident light by a first diffraction grating and the transmission of non-diffracted wavelengths further through the waveguide 24 for further refraction by other successive diffraction gratings.

To maximize the efficiency of the integrated-optic spectrometer, diffraction of the reflected incident light is preferred to occur at the center of the waveguide which is where intensity of the light is strongest. Therefore, a thicker sized waveguide is desired which also improves the ease and efficiency of introducing the reflected incident light into the waveguide 24.

Figure 3:
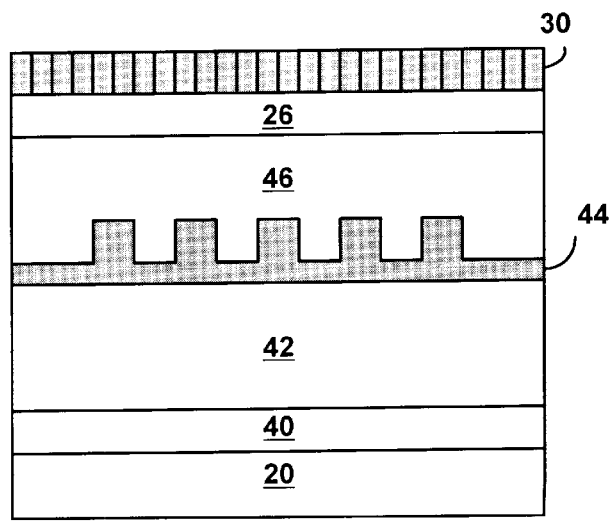
FIG. 3 shows a cross section of an integrated-optic spectrometer in accordance with a second embodiment of the present invention.

Referring to FIG. 3, a second embodiment of the present invention is shown which satisfies the need for thicker waveguides. In accordance with the second embodiment of the present invention, a first buffer layer 40 is fabricated upon the top layer of the substrate 20. This fabrication is accomplished by a process similar to the process described in the first embodiment of the invention. A first waveguide layer 42, preferably made of a high-index polymer or other material, is fabricated onto the first buffer layer 40, also by processes similar to those described in the first embodiment of the invention.

A thin grating layer 44 is then fabricated onto the first waveguide 42 using a positive grating line structure as depicted in FIG. 4. In a positive grating line structure, the thin grating layer 44 is created with the grating lines fabricated thereupon, instead of etched therefrom. As explained with reference to the first embodiment of the invention, the thin grating layer 44 may be deposited upon the first waveguide layer 42 by low-temperature sputtering, sol-gel solution techniques, spin-coating, or other techniques understood by one of ordinary skill in the art which accomplish the same results. Also, the grating structure may be fabricated by depositing additional buffer through openings in a positive photoresist layer. Similar to the first embodiment, instead of utilizing a positive grating line structure, the thin grating layer 44 may be etched, thereby creating a negative grating line structure.

A second waveguide layer 46 is fabricated onto the thin grating layer 44, once again utilizing methods previously demonstrated in the fabrication of the waveguide layer 24 (FIG. 2) utilized in the first embodiment. The second waveguide layer 46 provides a second path through which the reflected incident light may pass and serves to thicken the overall waveguide structure. Taken as a whole, and because the thin grating layer 44 is quite thin relative to the waveguide layers 42 and 46, the whole device behaves like a thick continuous waveguide with embedded diffraction gratings.

A clad 26 is fabricated to encompass the integrated-optic spectrometer, thereby protecting the waveguide layers 42, 46 from outside obstructions and interference.

Due to the specific positioning of the thin grating layer 44 in the middle of the two waveguide layers 42, 46, the thin grating layer 44 is located in the peak of the guided mode intensities, ensuring strong interactions with the thin grating layer 44, as opposed to less strong interaction in the first embodiment of the invention. Therefore, the second embodiment of the invention allows the thickness of the overall waveguide to be increased several-fold, providing improved efficiency.

Finally, a photodiode detector array 30 is attached to the top portion of the clad 26 for analyzing the refracted light. The purpose and composition of the photodiode detector array 30 is further discussed in the foregoing disclosure describing FIG. 6 and FIG. 7.

Figure 6:
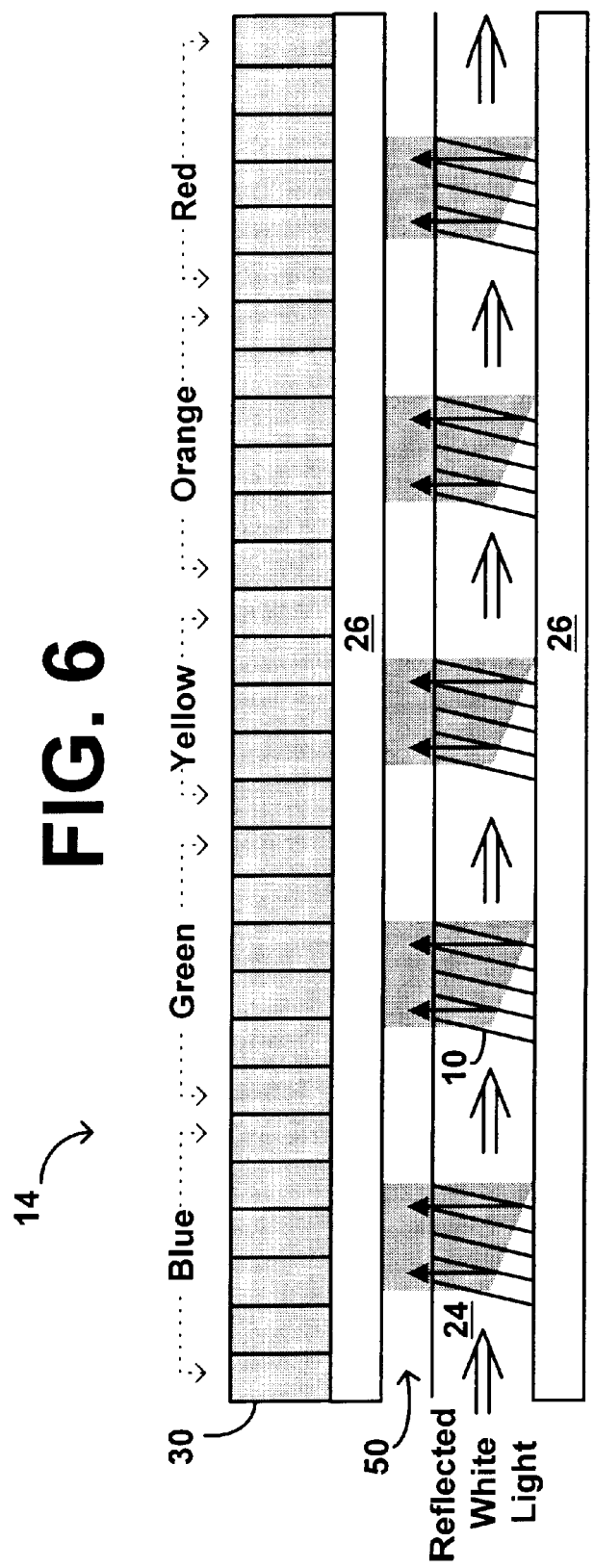
FIG. 6 depicts the diffraction and transmission of an inputted light source in a side view of the integrated-optic spectrometer having selected wavelengths diffracted out of the plane of the waveguide, in accordance with the first and second embodiments of the invention.

FIG. 6 illustrates diffraction of the reflected incident light into a photodiode detector array 30. In accordance with the first and second embodiments of the invention, the reflected incident light has discrete wavelengths diffracted out of the waveguide by a first diffraction grating. After being diffracted, the diffracted light then goes into the photodiode detector array 30 through the clad 26, to be analyzed for particular properties. The remaining wavelengths from the inputted light source are transmitted further within the waveguide 24 until further diffracted by successive diffraction gratings. As previously disclosed, the diffraction grating and grating lines are formed to provide for diffraction of the discrete wavelengths and optimal transmission of non-diffracted wavelengths.

The photodiode detector array 30 comprises a series of pixels which relate to specific wavelengths. These pixels are grouped and aligned to receive specific wavelengths from the reflected incident light after diffraction from the diffraction gratings. These pixels may relate to different colors within the visual spectrum, thereby allowing the integrated-optic spectrometer to analyze the color composition of the reflected incident light.

Figure 7:
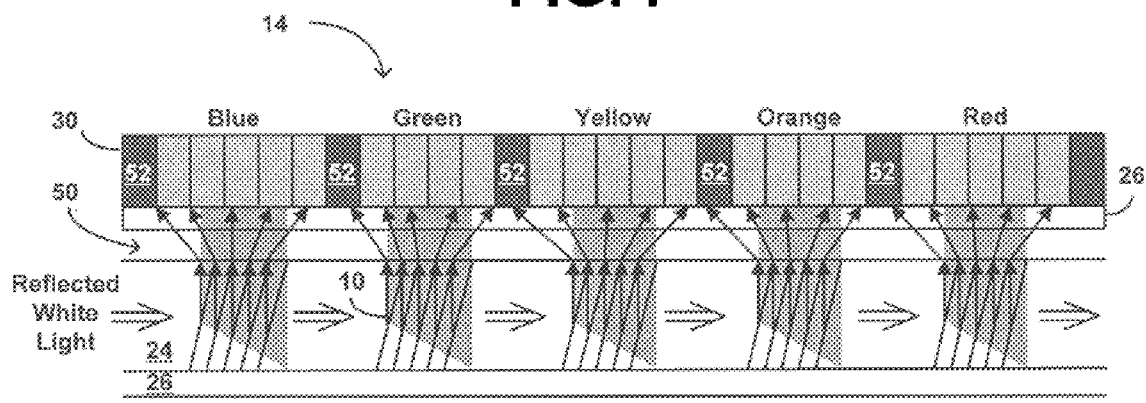
FIG. 7 depicts the diffraction and transmission of an inputted light source in the integrated-optic spectrometer in accordance with the first and second embodiments of the invention, wherein a stand-off layer is utilized between the waveguide and the detector array.

FIG. 7 better illustrates the diffraction of the inputted light source, in accordance with the first and second embodiments of the invention, as well as redirection by the addition of a stand-off layer 50. Since the clad 26 does not effect the diffraction of the reflected incident light, it is not shown. The stand-off layer 50 is located between the waveguide 24 and the clad 26. The standoff-layer 50 allows the refracted discrete wavelengths to spread, so that they may fall directly on one or more pixels of the photodiode detector array 30.

Dead pixels 52 may be provided within the photodiode detector array 30 so that there is a spread of, for example, approximately 5 to 7 pixels positioned to receive the diffracted wavelengths from a respective diffraction grating 10. Each of the pixels is also supplied with a unique set of wavelengths for evaluation. The dead pixels 52 prevent light refracted by the first grating from contaminating light refracted from a successive grating, and visa-versa.

Figure 8:
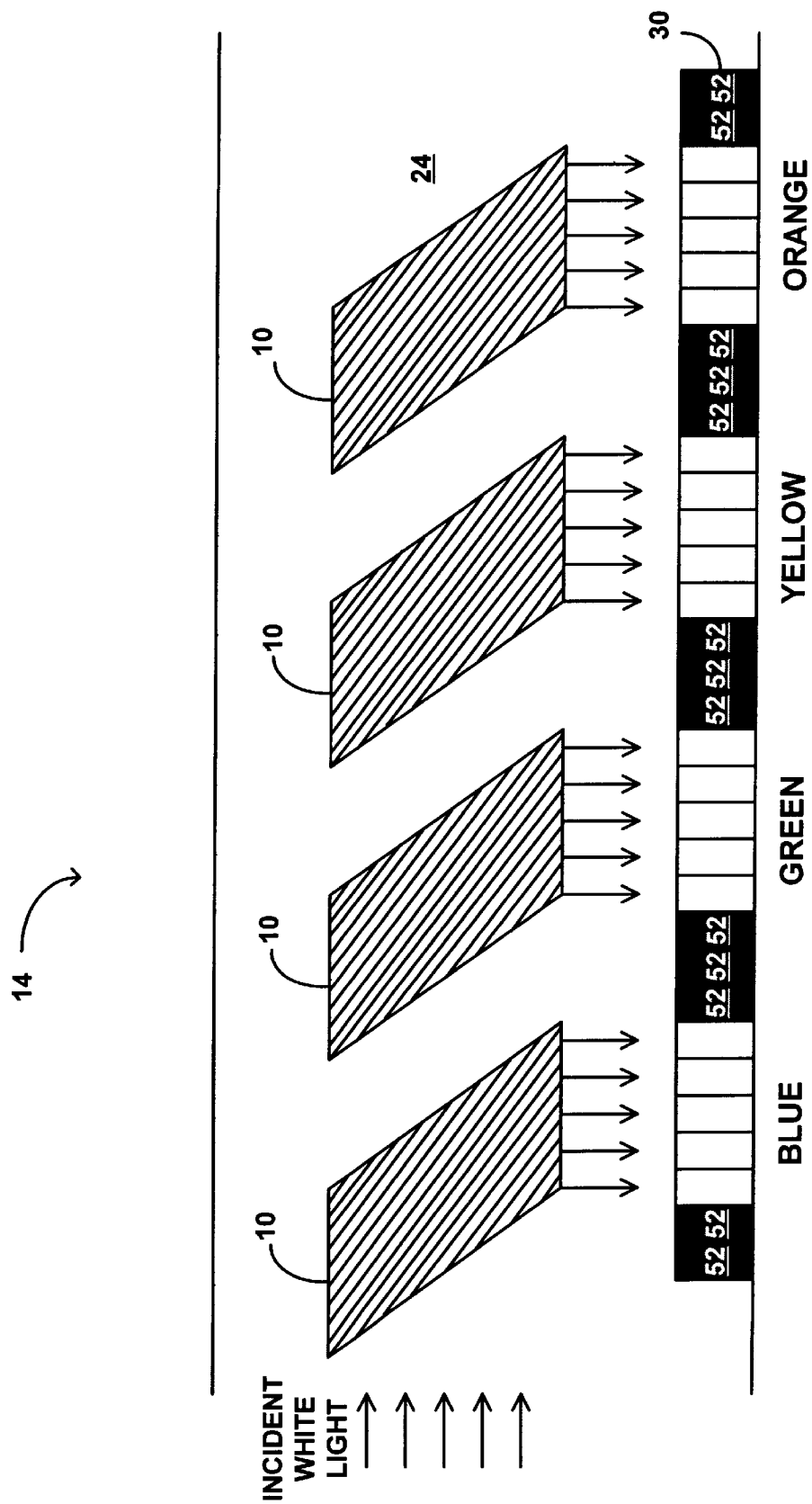
FIG. 8 depicts the diffraction and transmission of an inputted light source in a top view of the integrated-optic spectrometer in accordance with the first and second embodiments of the invention, having grating lines designed to diffract light of selected wavelengths at a specified angle within the plane of the waveguide.

FIG. 8 illustrates a top view of diffraction of the reflected incident light into the photodiode detector array 30 in accordance with the first and second embodiments of the invention. As discussed with reference to FIG. 1, the diffraction grating 10 and grating lines 12 are designed to diffract light of selected wavelengths, at a specified angle within the plane of the waveguide 24. This may be performed by utilizing the 30° parallelogram shaped diffraction grating 10 having individual grating lines at an angle of 45° to the direction of propagation of light within the waveguide 24.

Figure 9:
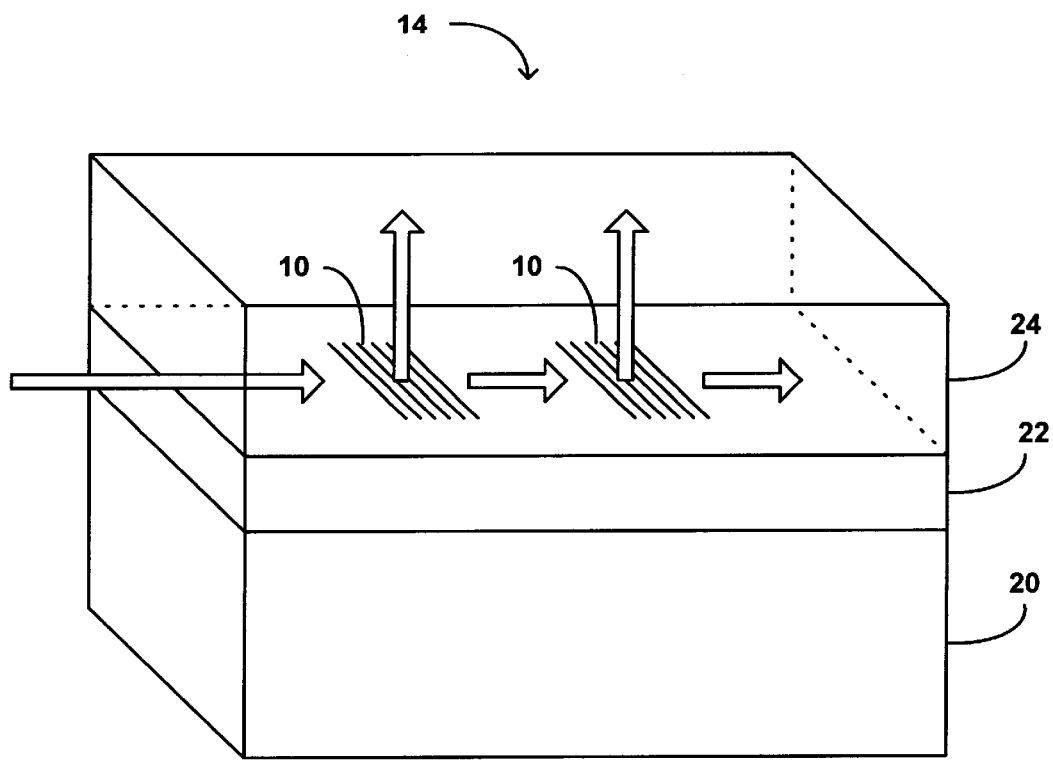
FIG. 9 depicts the diffraction and transmission of an inputted light source in the integrated-optic spectrometer in accordance with the first and second embodiments of the invention, having grating lines designed to diffract light of selected wavelengths at an angle more or less perpendicular to the plane of the waveguide.

FIG. 9 illustrates a top view of diffraction of the reflected incident light into a photodiode detector array 30 in accordance with the first and second embodiments of the invention, utilizing diffraction gratings 10 in the shape of a square or rectangle, with grating lines 12 at right angles to the direction of propagation of light within the waveguide 24. Since the abovementioned diffraction grating/grating line combination is utilized the light which is coupled out of the waveguide 24 is in a direction which is more or less perpendicular to the plane of the waveguide.

The foregoing has been illustrative of the features and principles of the present invention. Various changes or modifications to the invention may be apparent to those skilled in the art without departure from the spirit and scope of the invention. All such changes or modifications are intended to be included herein and within the scope of the invention.

What is claimed is:

1. An integrated-optic spectrometer capable of analyzing light, comprising:

a buffer layer created on the top layer of a substrate;

at least one diffraction grating formed on said buffer layer, said diffraction grating being constructed of a series of grating lines;

a waveguide, fabricated onto said buffer layer capable of guiding said light within said integrated-optic spectrometer; and a photodiode detector array, capable of analyzing discrete wavelengths, mounted on top of said waveguide, said photodiode detector array containing a series of pixels therein, wherein said diffraction grating is capable of diffracting discrete wavelengths out of said waveguide and into said photodiode detector array.

2. The spectrometer of claim 1, wherein said diffraction grating is constructed as a four cornered shape with said grating lines at right angles to the direction of propagation of light within said waveguide.

3. The spectrometer of claim 1, wherein said diffraction grating is constructed as a 30 degree parallelogram with said individual grating lines at an angle of 45 degrees with the vertical plane of said waveguide.

4. The spectrometer of claim 1, wherein said discrete wavelengths correspond to specific colors within the visual spectrum, wherein the wavelengths included in each color are out-coupled by each diffraction grating.

5. The spectrometer of claim 1, wherein said diffraction grating is further defined by a positive grating structure.

6. The spectrometer of claim 1, wherein said diffraction grating is further defined by a negative grating structure.

7. The spectrometer of claim 1, further comprising a clad, located between said waveguide and said photodiode detector array.

8. The spectrometer of claim 1, further comprising a standoff layer located between said waveguide and said photodiode detector array, wherein said standoff layer provides for spreading of said light after diffraction by said diffraction grating to match said pixels of said photodiode detector array.

9. An integrated-optic spectrometer capable of analyzing light, comprising:

a substrate, the top layer of said substrate being oxidized to form a first buffer layer;

a first waveguide layer fabricated onto said first buffer layer;

a second buffer layer fabricated onto said first waveguide layer;

at least one diffraction grating formed on said second buffer layer, wherein said diffraction grating is constructed of a series of grating lines;

a second waveguide layer, fabricated onto said second buffer layer;

a photodiode detector array capable of analyzing discrete wavelengths, said photodiode detector array being mounted on top of said second waveguide layer; and a clad encompassing said integrated-optic spectrometer, wherein said diffraction grating is capable of diffracting discrete wavelengths out of said second waveguide layer and into said photodiode detector array, while maximizing transmission of non-diffracted wavelengths.

10. The spectrometer of claim 9, wherein said diffraction grating is constructed as a 30 degree parallelogram with said grating lines at an angle of 45 degrees with the vertical plane of said second polymer.

11. The spectrometer of claim 9, wherein said discrete wavelengths correspond to the wavelengths which make specific colors within the visual spectrum, wherein a different color is out-coupled by each diffraction grating.

12. The diffraction grating of claim 9, wherein said diffraction grating is further defined by a positive grating structure.

13. The diffraction grating of claim 9, wherein said diffraction grating is further defined by a negative grating structure.

14. A diffraction grating for diffracting an inputted light source within a waveguide comprising:

a series of grating lines;

wherein said grating lines have a peripheral boundary shaped to optimize the diffraction and transmission of said inputted light source.

15. The diffraction grating of claim 14, wherein said diffraction grating is further defined by a positive grating structure.

16. The diffraction grating of claim 14, wherein said diffraction grating is further defined by a negative grating structure.

17. The diffraction grating of claim 14, wherein said diffraction grating is constructed as a four cornered shape with said series of grating lines at a right angle to the direction of propagation of said light within said waveguide.

18. The diffraction grating of claim 14, wherein said diffraction grating is constructed as a 30 degree parallelogram with said series of grating lines at an angle of 45 degrees with the vertical plane of said waveguide.

19. A method for creating an integrated-optic spectrometer comprising the steps of:

creating a first buffer layer on the top surface layer of a substrate;

fabricating a first waveguide layer on said first buffer layer;

fabricating a second buffer layer on the surface of said first waveguide layer;

forming at least one diffraction grating on the surface of said second buffer layer;

fabricating a second waveguide layer on the surface of said second buffer layer;

mounting a photodiode detector array onto said second waveguide layer, wherein said photodiode detector array is capable of analyzing discrete wavelengths; and encompassing said integrated-optic spectrometer with a clad.

20. A means for analyzing the composition of reflected light utilizing an integrated-optic spectrometer comprising the steps of:

receiving a reflected light source through a waveguide; and refracting discrete wavelengths from said reflected light source via at least one diffraction grating, having a series of diffraction lines, into a photodiode detector array for analysis, while optimally transmitting non-refracted wavelengths further within said waveguide.

* * * * *

UNITED STATES PATENT AND TRADEMARK OFFICE
CERTIFICATE OF CORRECTION

PATENT NO. : 6,226,083 B1
DATED : May 1, 2001
INVENTOR(S) : Schwerzel et al.

It is certified that error appears in the above-identified patent and that said Letters Patent is hereby corrected as shown below:

Column 1,
Line 38, delete "Therefore, there is a need in."

Column 2,
Line 29, delete "in" and substitute therefore -- is --.

Column 5,
Line 4, delete "dioxide."

Signed and Sealed this

Fifth Day of February, 2002

Attest:

JAMES E. ROGAN
Attesting Officer  Director of the United States Patent and Trademark Office